United States Patent [19]
Hardcastle

[11] Patent Number: 5,422,752
[45] Date of Patent: Jun. 6, 1995

[54] OPTICAL TRANSMISSION SYSTEM
[75] Inventor: Ian Hardcastle, Harlow, United Kingdom
[73] Assignee: Northern Telecom Limited, Montreal, Canada
[21] Appl. No.: 20,690
[22] Filed: Feb. 22, 1993
[30] Foreign Application Priority Data
Feb. 25, 1992 [GB] United Kingdom ................ 9203949
[51] Int. Cl.⁶ ............................................ H04B 10/04
[52] U.S. Cl. ..................... 359/183; 359/187; 359/191; 359/194
[58] Field of Search ............... 359/180, 181, 182, 187, 359/188, 189, 190, 191, 194, 195; 372/32

[56] References Cited

U.S. PATENT DOCUMENTS

| | | | |
|---|---|---|---|
| 4,912,527 | 3/1990 | Yamazaki | 359/191 |
| 4,955,026 | 9/1990 | Hill et al. | 372/32 |
| 5,142,402 | 8/1992 | Tsushima | 359/156 |
| 5,200,967 | 4/1993 | Miyata | 372/32 |
| 5,247,382 | 9/1993 | Suzuki | 359/189 |
| 5,307,197 | 4/1994 | Tanabe et al. | 359/192 |

FOREIGN PATENT DOCUMENTS

| | | | |
|---|---|---|---|
| 0314097 | 5/1989 | European Pat. Off. | 359/190 |
| 0018133 | 1/1987 | Japan | 359/191 |
| 2107147 | 4/1983 | United Kingdom | H04B 9/00 |

OTHER PUBLICATIONS

Bryant, et al., "A 1.2 Gbit/s optical FSK field trial demonstration", Br. Telecom Technol J., vol. 8, No. 2, Apr. 1980, pp. 18–26.
Hardcastle, et al., "High Performance 140 Mbit/s FSK Coherent System", Electronics Letters, vol. 26, No. 18, Aug. 30, 1990, pp. 1523–1524.

*Primary Examiner*—David K. Moore
*Assistant Examiner*—Rafael Barares
*Attorney, Agent, or Firm*—Lee, Mann, Smith, McWilliams, Sweeney & Ohlson

[57] ABSTRACT

An optical transmission system utilizing at a transmitter (100) continuous phase frequency shift keyed modulation of a laser (14) and a coherent heterodyne receiver (200) therefor, the system including at the transmitter means for imposing (18,12) a low frequency modulation on the transmitter optical power and frequency deviation and at the receiver means for extracting (28) from the receiver AGC control signal a replica of the low frequency modulation, means for demodulating (32) the modulated frequency deviation of the received optical signal synchronously with respect to the extracted low frequency signal, means for deriving (34) from the demodulated signal an error signal and a control system responsive to the error signal to control the receiver local oscillator (22) frequency.

3 Claims, 2 Drawing Sheets

OPTICAL TRANSMISSION SYSTEM

BACKGROUND OF THE INVENTION

This invention relates to an optical transmission system and to receiver tracking arrangements therefor.

FIELD OF THE INVENTION

A common form of modulation used in optical transmission systems is that known as frequency shift keying (FSK) in which data modulation is impressed as a small frequency shift at the laser output. The resulting frequency modulated optical signal is then passed through an optical discriminator, i.e. an optical filter, to convert the frequency modulated optical signal to an intensity modulated (IM) optical signal. This kind of modulation conversion is described for instance, in British patent specification 2 107 147A.

The FSK is converted to IM by arranging for the frequency spectrum of the optical filter characteristic of the optical discriminator to be matched with the FSK output frequencies so that these frequencies are transmitted by the discriminator with widely different optical attenuations. Particularly in the case of injection lasers, the unregulated output frequency is liable to drift with time so that, in a matter of perhaps only a few minutes, the frequency has drifted by amounts as large as the frequency difference of the FSK. In these circumstances steps need to be taken either to stabilise the optical output of the injection laser against frequency drifts of this magnitude, or some form of feedback control loop is required to provide active matching of the FSK output with the spectral characteristic of the discriminator.

One method for deriving feedback signal for regulating the FSK output frequencies of a transmitter injection laser to match the spectral characteristic of a discriminator taking the form of a Mach Zehnder interferometer, also in the transmitter, has been described by E. G. Bryant et al in an article entitled 'A 1.2 Gbit/s optical FSK field trial demonstration' (Br Telecom Technol J Vol 8 No 2 pp 18–26, April 1990). This method involves impressing a low frequency modulation upon the centre frequency of the injection laser, and using the resulting modulation of an output of the Mach Zehnder interferometer to provide a feedback control signal which regulates the injection laser bias current. However, this method is not applicable where the FSK signal is transmitted over the system and the conversion to IM takes place only in the receiver.

In "High Performance 140 Mbit/s FSK Coherent System", I Hardcastle et al, Electronics Letters, 30th August 1990, Vol.26 No. 18, pp 1523-1524, there is described a 140 Mbit/s FSK heterodyne coherent transmission system having automatic frequency and polarisation acquisition and tracking. In that system the FSK modulation is transmitted over the system to the receiver and the conversion to IM takes place in the receiver. In that system a feedback arrangement utilises part of the receiver front end electrical signal to provide a control signal for a local oscillator laser the optical output of which is heterodyne with the incoming FSK to demodulate the optical signal to IF. Such a system, however, requires i the receiver architecture a separate local oscillator tracking filter.

The present invention utilises the characteristics of a form of FSK modulation known as continuous phase FSK (CPFSK) modulation.

SUMMARY OF THE INVENTION

According to the present invention there is provided an optical transmission system utilising at a transmitter continuous phase frequency shift keyed modulation of a laser and a coherent heterodyne receiver therefor, the system including at the transmitter means for imposing a low frequency modulation on the transmitter optical power and frequency deviation and at the receiver means for extracting from the receiver AGC control signal a replica of the low frequency modulation, means for demodulating the modulated frequency deviation of the received optical signal synchronously with respect to the extracted low frequency signal, means for deriving from the demodulated signal an error signal and a control system responsive to the error signal to control the receiver local oscillator frequency.

BRIEF DESCRIPTION OF THE DRAWINGS

An embodiment of the invention will now be described with reference to the accompanying drawings, in which.

DESCRIPTION OF THE PREFERRED EMBODIMENTS

Figure 1:
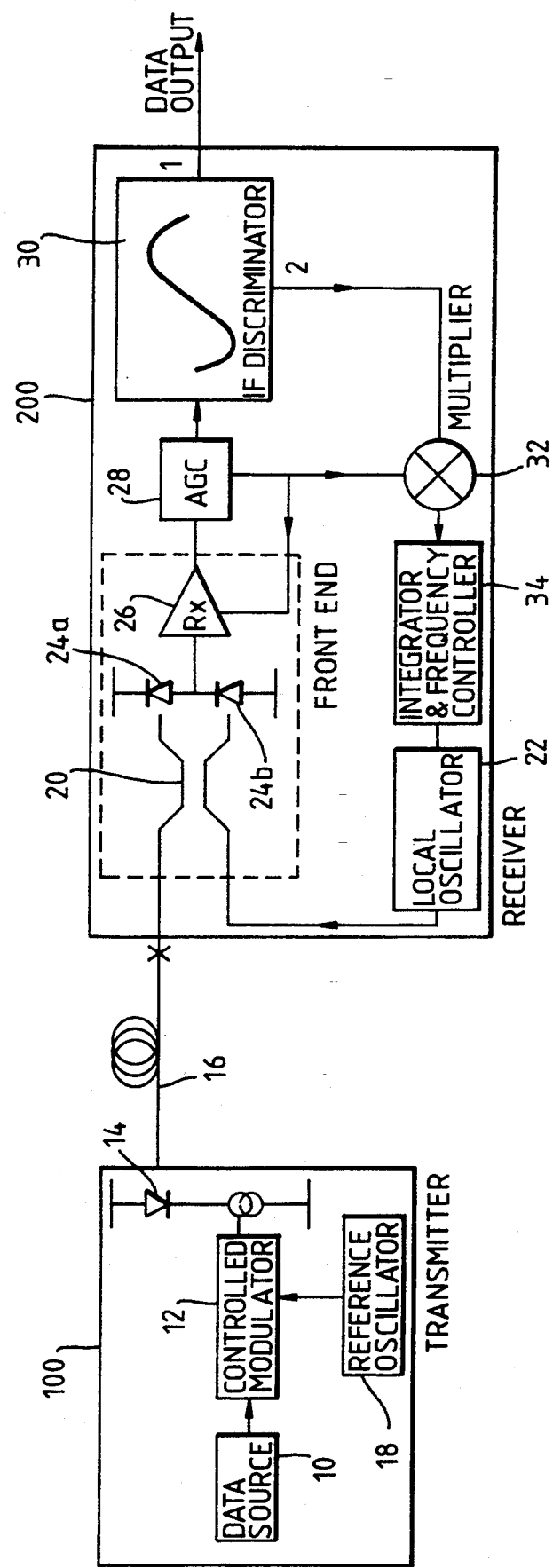
FIG. 1 is a system block diagram of a CPFSK system.
Figure 2:
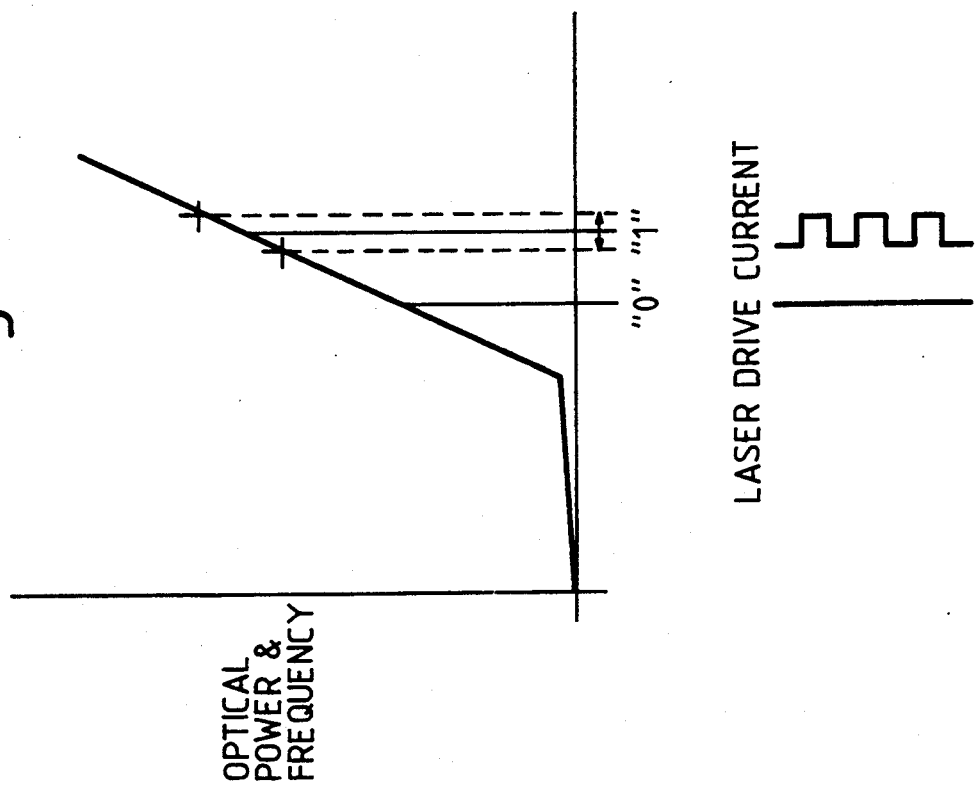
FIG. 2 illustrates a laser modulation characteristic.

In the system illustrated in FIG. 1 a digital data source 10 in transmitter 100 feeds a data signal to a controlled modulator 12 which controls the drive current for a laser 14. The optical output of the laser is transmitted via optical fibre 16 to receiver 200. The transmitter also includes a reference oscillator 18 which provides a low frequency signal of less than 100 KHz, e.g. 10–20 KHz, which is applied to the modulator 12 to impose a varying modulation depth on both the optical power and optical frequency of the laser output. For example, if the laser drive current modulator 12 causes the laser drive current to have a fixed value for binary data '0' then the current for binary data '1' is varied by a small amount at the low frequency. This is illustrated in FIG. 2 which shows a plot of optical power and frequency against drive current.

Figure 3:
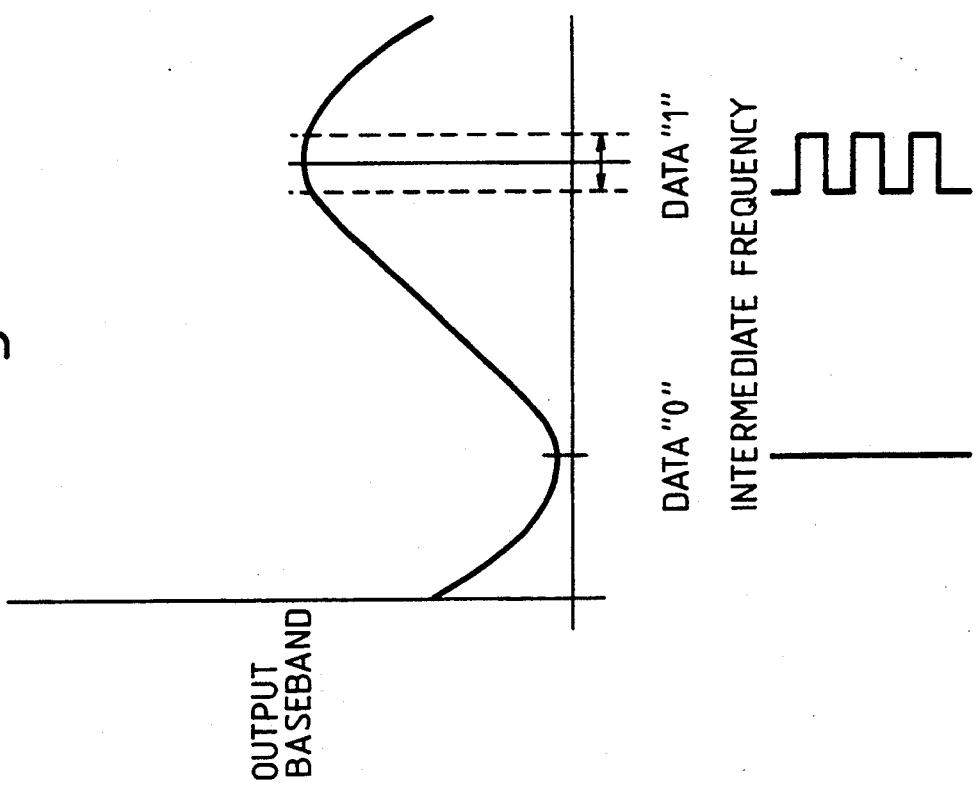
FIG. 3 illustrates an intermediate frequency discriminator characteristic.

In the receiver 200 the incoming optical signal is mixed in optical coupler 20 with the optical output of a local oscillator laser 22. The coupler output feeds balanced photodetectors 24a, 24b and the resulting electrical signal is fed to receiver amplifier 26. The amplifier output is passed through an AGC circuit 28 to IF discriminator 30 to form the data output. The AGC circuit 28 produces a feedback signal to control the gain of amplifier 26. The AGC feedback signal is also applied to a multiplier 32 together with the baseband output from the IF discriminator. The multiplier effectively demodulates the variation imposed on the data '1' content of the optical signal as shown in FIG. 3. The resulting output of the multiplier in effect forms an error signal which is proportional to the error between the data '1' IF frequency and the IF discriminator characteristic. This error signal feeds an integrator-based control circuit 34 which determines the frequency of the local oscillator laser 22. The receiver thus automatically aligns the IF frequencies to the characteristics of the demodulating frequency discriminator, reducing any frequency error between the nominal IF frequency and the frequency discriminator characteristic. The arrangement suppresses the frequency error which would otherwise exist due to any temperature or time induced discrepancy between the characteristics of the demodulating frequency discriminator and the IF tracking filter which would normally be found in an FSK system.

I claim:

1. A receiver for a CPFSK optical transmission system, said receiver comprising:

an optical coupler, a local oscillator controlled by an integrater based frequency control signal for producing a local signal which is coupled with a received optical signal by the coupler for producing IF signals, balanced photodetectors which detect the IF signals and produce electrical signals responsive thereto, a receiver amplifier which amplifies said electrical signals, and a demodulator/discriminator arrangement including an AGC circuit, an IF discriminator and a multiplier, wherein the AGC circuit receives an input from the amplifier and outputs a data signal to the IF discriminator and a feedback signal, and the IF discrimininator produces an output data signal and a second, baseband output which is multiplied by the multiplier with the AGC feedback signal, whereby the multiplier outputs to said integrator based control circuit a signal which determines the frequency of the local oscillator laser which reduces any frequency error between a nominal data IF frequency and the IF discriminator frequency characteristic.

2. An optical transmission system utilising at a transmitter, continuous phase frequency shift keyed modulation of a laser and a coherent heterodyne receiver therefor, the system including at the transmitter means for imposing a low-frequency modulation on the transmitter optical power, wherein the receiver comprises:

an optical coupler, a local oscillator controlled by an integrater based frequency control signal for producing a local signal which is coupled with a received optical signal via the coupler for producing IF signals, balanced photodetectors which detect the IF signals and produce electrical signals responsive thereto, a receiver amplifier which amplifies said electrical signals, and a demodulator/discriminator arrangement including an AGC circuit, an IF discriminator and a multiplier, wherein the AGC circuit receives an input from the amplifier and outputs a data signal to the IF discriminator and a feedback signal, and the IF discrimininator produces an output data signal and a second, baseband output which is multiplied by the multiplier with the AGC feedback signal, whereby the multiplier outputs to said integrator based control circuit a signal which determines the frequency of the local oscillator laser which reduces any frequency error between a nominal data IF frequency and the IF discriminator frequency characteristic.

3. A method of controlling local oscillator frequency in a receiver for a continuous phase frequency shift-keyed modulation optical transmission system, said method comprising the steps of;

at the transmitter, superimposing a low frequency reference modulation on the transmitted signal, and at the receiver, mixing the received signal in an optical coupler with the output of a local oscillator laser, outputting signals from the coupler to balanced photodetectors to produce electrical signals responsive to IF signals output from the coupler, amplifying said electrical signals and passing an amplified electrical signal through an AGC circuit and an IF discriminator to a data output, multiplying a feedback signal derived from the AGC circuit with a second, baseband output from the IF discriminator to provide an input to an integrater based control circuit which drives the local oscillator laser whereby any frequency error between a nominal data IF frequency and the IF discriminator frequency characteristic is reduced.

* * * * *